L. MANDEL.
CAMERA ATTACHMENT.
APPLICATION FILED OCT. 25, 1920.
1,394,568.
Patented Oct. 25, 1921.
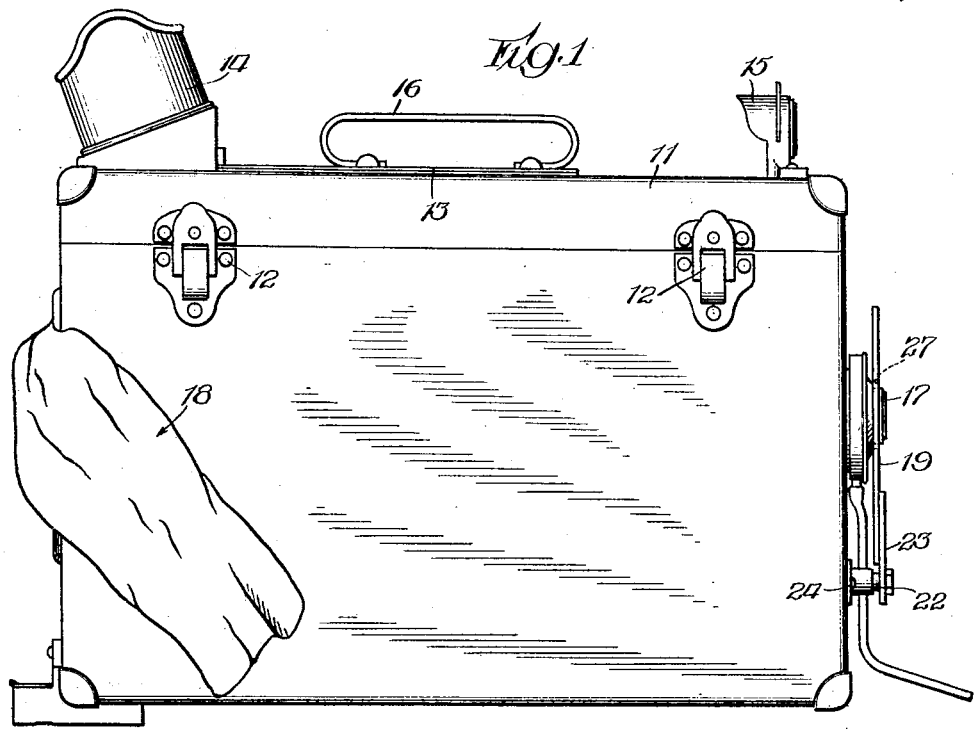
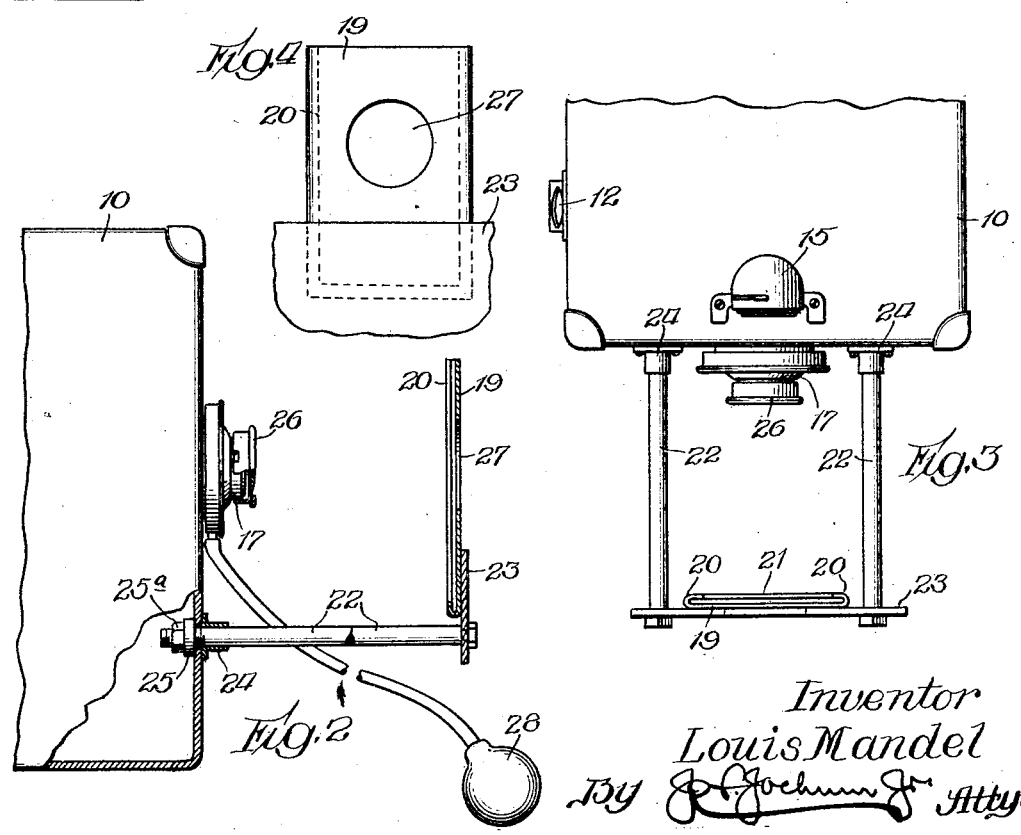
Inventor
Louis Mandel

UNITED STATES PATENT OFFICE.

LOUIS MANDEL, OF CHICAGO, ILLINOIS.

CAMERA ATTACHMENT.

1,394,568.   Specification of Letters Patent.   Patented Oct. 25, 1921.

Application filed October 25, 1920. Serial No. 419,185.

*To all whom it may concern:*

Be it known that I, LOUIS MANDEL, a citizen of the United States, residing at Chicago, in the county of Cook and State of Illinois, have invented certain new and useful Improvements in Camera Attachments, of which the following is a specification.

This invention relates to improvements in camera attachment by means of which a negative or object may be mounted or supported in front of the lens and from which negative or object, and preferably by the use of a freely removable and attachable lens, reproductions or prints may be made by photographic process.

Heretofore, a negative is produced in the ordinary and well known manner, then a sensitized paper or other sensitized object is brought into direct contact with the negative, and printed by allowing the light rays to pass through the negative, thus printing an image upon the sensitized paper or other sensitized object. Another well known method is by means of the enlarging process, by which photos are usually made in the following manner, a negative is mounted within an enlarging camera and the photographic print or enlargement is made by allowing direct rays of light to pass through the negative onto the sensitized paper or other sensitized object, thus printing an image through the lens of the camera upon the sensitized paper or other sensitized object. The present invention differs from the prior processes in that in the present invention the negative may be made upon either transparent or opaque substances. The negative is then mounted upon a support in front of the camera and photographed upon another sensitized card or other sensitized object, thus producing a positive. The present process does not depend upon the light rays passing through the negative as with the present apparatus an exposure is made of the negative in the same manner as the negative is made. Thus by making a regular photographic exposure of the negative the result is practically a negative of the negative, which of course is a positive.

A further object is to provide an improved support of this character adapted when not in use to be collapsed or adjusted into close proximity to the camera, the said support or holder being preferably provided with an opening into which the camera lens projects so as not to obstruct the lens or interfere with the ordinary use of the camera for photographic purposes, and at the same time permitting the holder to be moved close to the camera box or body.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention and in which—

Figure 1 is a side elevation of a camera having the attachment applied thereto and showing the same collapsed with respect to the camera box or body.

Fig. 2 is a detail view partly in elevation, partly in section, and partly broken away showing the attachment in position for use.

Fig. 3 is a top plan view of the parts in the position shown in Fig. 2.

Fig. 4 is a view of a detail.

In the drawing there is shown a well-known form of camera body or box to which this attachment has been applied for the purpose of illustration, but it is to be understood that the attachment may be employed with any other form of camera with equal efficiency.

In the form shown in the drawing the numeral 10, designates a camera body or box provided with a cover 11, adapted to be secured in a closed position by means of suitable fastening devices 12. The camera is provided with ruby light openings 13, a sight opening 14, a finder 15, a handle 16, and the ordinary lens 17. In the form shown the camera is of that type in which the operator may place his hand into the camera body or box through a suitable opening and around which opening is arranged a sleeve 18 for excluding the light.

All of the above referred to parts are of the ordinary and well-known construction and constitutes no part of the present invention.

The support or holder for the negative or object to be reproduced may be of any desired size and configuration but preferably embodies a body portion 19, constructed of sheet material, such as metal, the lateral edges 20, thereof being flanged back upon the body portion and spaced therefrom to form guides and the bottom portion of the body is also deflected or bent back upon itself as at 21, to form a rest which coöperates with the guides 20, and upon which rest 21, the negative or object engages when placed within the guides 20.

This support 19, is held in position in any suitable manner for adjustment toward and away from the camera box or body 10, preferably by means of spaced arms 22, one end of each of which is connected with the support 19, either directly thereto or through the medium of an additional element 23, which is connected with the support 19. These arms 22, are spaced laterally from each other and move within suitable guides or bearings 24, which latter are secured to the camera body and communicate with openings in the wall of the camera body so that the arms 22, when moved in the bearings 24, to adjust the support 19, toward and away from the lens 17, will move into and out of the camera body or box. A suitable stop 25, preferably in the form of a collar threaded upon each of the arms 22, and held in their adjusted positions upon the respective arms by nuts 25ª, and by means of which stops the support 19, is limited in its movement in one direction.

The support 19, is so positioned with respect to the lens 17, that when the support is moved outwardly to the position shown in Figs. 2 and 3, for the purpose of making photographic reproductions of the negative or object held thereby, the latter will be spaced in front of the lens 17, and an additional or supplemental lens 26, of a focus different from the focus of the lens 17, is provided to coöperate with the support 19, and this lens 26, is adapted to be freely attached and detached from the lens 17.

In order that the support 19, will not interfere with or obstruct the vision of the lens 17, when it is desired to use the camera for ordinary photographic purposes, the support is provided with an opening 27, therein, in alinement with the lens 17, so that when the support 19, is collapsed with respect to the camera body 10, that is to move toward the lens 17, so as to cause the support 19, to assume a position in close proximity to the camera box or body, the lens 17, will project into the opening 27. Obviously the arms 22, may fit the bearings 24, with such a degree of friction that the support 19, may be readily adjusted when desired, but by means of which friction will be held in its adjusted position.

The opening 27, in the support 19, also serves the function of assisting in the removal of the negative or object from the support 19, as the operator may grasp the negative or object between the thumb and one of the fingers and at the same time allow the finger to engage the back of the negative or object through the opening 27.

It is thought that the operation of this device will be clearly understood but briefly stated it is as follows:

The ordinary and original photographic reproduction or negative from the object which it is desired to photograph is taken in the ordinary manner, that is photographically, it being of course understood that during this process of the original photographing of the object to produce the negative, the support 19, is adjusted to stand close to the camera box or body as shown in Fig. 1. After the negative has been developed and it is desired to make photographic reproductions from this negative, the support 19, is adjusted away from the camera box or body and the degree of adjustment will be limited by the stop 25. The negative is then placed within the guides 20, to engage the rest 21, after which the supplemental lens 26, is placed over the lens 17, and the photographic reproduction or positive may be then produced upon a sensitized card or other sensitized material within the camera box or body, either by a time exposure or by operating the shutter through the medium of the ordinary and well-known bulb 28.

With this improved attachment, any number of photographic reproductions may be made.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. In combination, a camera embodying a lens, a support for a negative or the like connected with the camera and movable into and out of a predetermined position in front of the lens, the said support having an opening therein in alinement with the said lens and into which opening the said lens is adapted to project to permit the said support to be moved into close proximity to the camera body or box.

2. In combination a camera embodying a lens, a support for a negative or the like connected with the camera and movable into and out of a predetermined position in front of the lens, and a supplemental lens attachable to and removable from the first recited lens for producing a photographic reproduction from the said negative, the said supplemental lens being of a different focus from the focus of the first recited lens, the said support having an opening therein in alinement with the first recited lens and into which opening the first recited lens is adapted to project to permit the said support to be moved into close proximity to the camera body or box.

3. In combination, a camera embodying a lens, a support connected with the camera body or box, a holder for a negative or the like connected with the support and disposed to hold the negative in front of the lens, said support being adjustable whereby the said holder may be moved toward and away from the lens, the said holder having an opening therethrough in alinement with the said lens and into which opening the lens projects when the holder is moved close to the camera body or box, the said opening also serving to permit a ready removal of the negative from the holder.

4. In combination a camera embodying a lens, a support connected with the camera body or box, a holder for a negative or the like connected with the support and disposed to hold the negative in front of the lens, said support being adjustable whereby the said holder may be moved toward and away from the lens, and a supplemental lens coöperating with the said holder and freely attachable to and removable from the first recited lens for changing the focus thereof when the support is in an operative position, the said holder having an opening therethrough in alinement with the first recited lens and into which opening the lens projects when the holder is moved close to the camera body or box, said opening also serving to permit a ready removal of the negative from the holder.

In testimony whereof I have signed my name to this specification, on this 21st day of October, A. D. 1920.

LOUIS MANDEL.